United States Patent [19]

Campbell

[11] Patent Number: 4,922,591
[45] Date of Patent: May 8, 1990

[54] TOOL STORAGE AND CHANGING SYSTEM

[75] Inventor: Michael E. Campbell, Farmington Hills, Mich.

[73] Assignee: Carboloy Inc., Warren, Mich.

[21] Appl. No.: 591,355

[22] Filed: Mar. 20, 1984

[51] Int. Cl.$^5$ ............................................ B23Q 3/155
[52] U.S. Cl. ...................................... 29/26 A; 29/568
[58] Field of Search ....................... 29/26 A, 563, 568; 101/288

[56] References Cited

U.S. PATENT DOCUMENTS

| | | | |
|---|---|---|---|
| 3,173,204 | 3/1965 | Anthony | 29/568 |
| 3,355,798 | 12/1967 | Drechsler | 29/568 |
| 4,276,112 | 6/1981 | French et al. | 101/288 X |
| 4,404,506 | 9/1983 | Nishimura et al. | 29/508 X |

FOREIGN PATENT DOCUMENTS

1210917 11/1970 United Kingdom .................. 29/568

Primary Examiner—Eugene F. Desmond
Attorney, Agent, or Firm—Burns, Doane, Swecker & Mathis

[57] ABSTRACT

A system and method for storing and selectively transferring cutting tools to a tool holder of a machine tool comprising a bar coder for providing coded labels containing information such as the type of tool and their offsets and affixing the label to the cutting tools. The indexed cutting tools are placed in a tool storage magazine that presents the tools for transfer where a bar code reader scans the labels and selects the needed cutting tool. A tool changing mechanism grips the selected tool, removes it from the storage magazine and transfers it to the tool holder while concurrently transferring a cutting tool from the tool holder to the storage magizine.

7 Claims, 9 Drawing Sheets

TOOL STORAGE AND CHANGING SYSTEM

BACKGROUND OF THE INVENTION

1. Field of the Invention

This invention relates to apparatus for and method of storing and changing cutting tools for machine tools.

2. Description of the Prior Art

There is continuing need to minimize down time in changing cutting tools at the machine tool and to minimize scrapping of the machined parts even for the presently available advanced computer numerically controlled lathes and turning centers.

The Pre-Gauging Tool System disclosed in the application of Michael E. Campbell U.S. Application No. 591,356, allowed July 2, 1985, filed simultaneously herewith and owned by the assignee of the present invention, the entire disclosure of which is hereby incorporated herein, reduces down time and scrapping of machined parts by measuring the cutting tools before their use and installation at the work station. The system pre-gauges the differences in dimensions between cutting tools of the same type. This permits the operator or the control for the machine tool to quickly and easily make adjustments for any offsets in the dimensions between cutting tools without time consuming setting up delays. Furthermore, the repeatability of accurate settings help to significantly reduce the scrapping of the machined parts.

There remains, however, a need for an additional system for storing cutting tools, which preferably have been pre-gauged, and for quickly and accurately selecting and delivering the needed cutting tool to the tool holding device of the machine tool, all to still further reduce down time and the scrapping of machined parts.

SUMMARY OF THE INVENTION

In accordance with the present invention there is provided a new and unique system which stores cutting tools and which selectively transfers stored cutting tools to a tool holder of a machine tool. Prior to storage, the cutting tools preferably are pre-gauged to measure the offset between tools, and the type of tools and their offsets are provided on bar coded labels affixed thereto. A plurality of the indexed cutting tools are placed in a storage means for selection and transfer. When a cutting tool is needed a bar code reader scans the coded labels or strips as the tools are presented by the storage means. The reader selects the needed cutting tool and the system readies the tool for transfer. A tool changing mechanism then grips the selected tool and removes it from the storage means and transfers it to the tool holder. Preferably, the tool changing mechanism concurrently can grip the cutting tool in the tool holder and transfer it to the storage means.

Upon completion of the transfer, the operator or the control of the machine tool easily and quickly can make an adjustment for the offset in the selected cutting tool. The machine tool now is ready to commence accurate machining of parts without the heretofore encountered delays.

BRIEF DESCRIPTION OF THE DRAWINGS

The following is a detailed description together with accompanying drawings of an illustrative embodiment of the invention. It is to be understood that the invention is capable of modification and variation apparent to those skilled in the art within the spirit and scope of the invention.

DETAILED DESCRIPTION OF THE INVENTION

Figure 1:
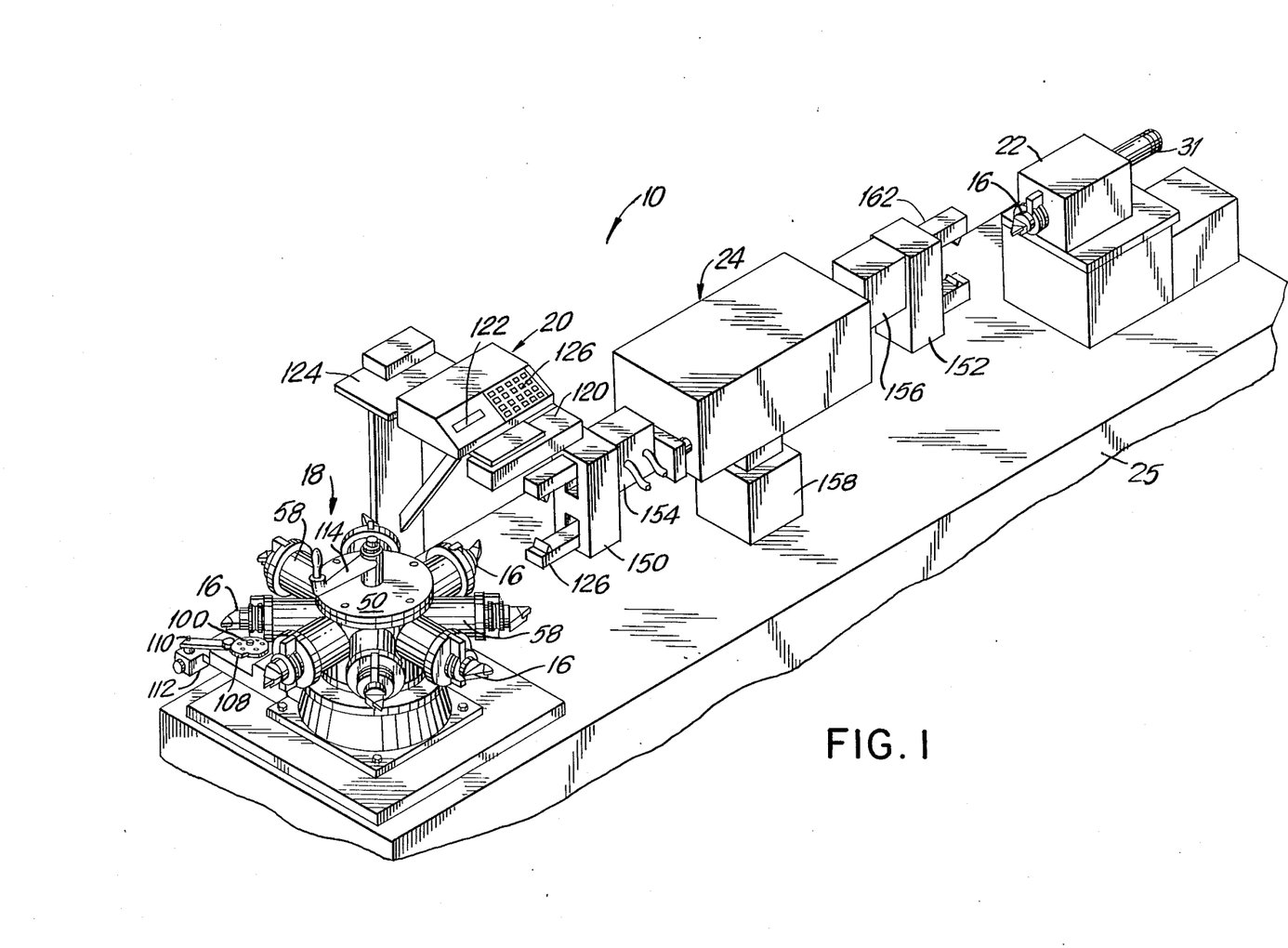
FIG. 1 is a perspective view of one embodiment of the tool storage and changing system of the invention.
Figure 2:
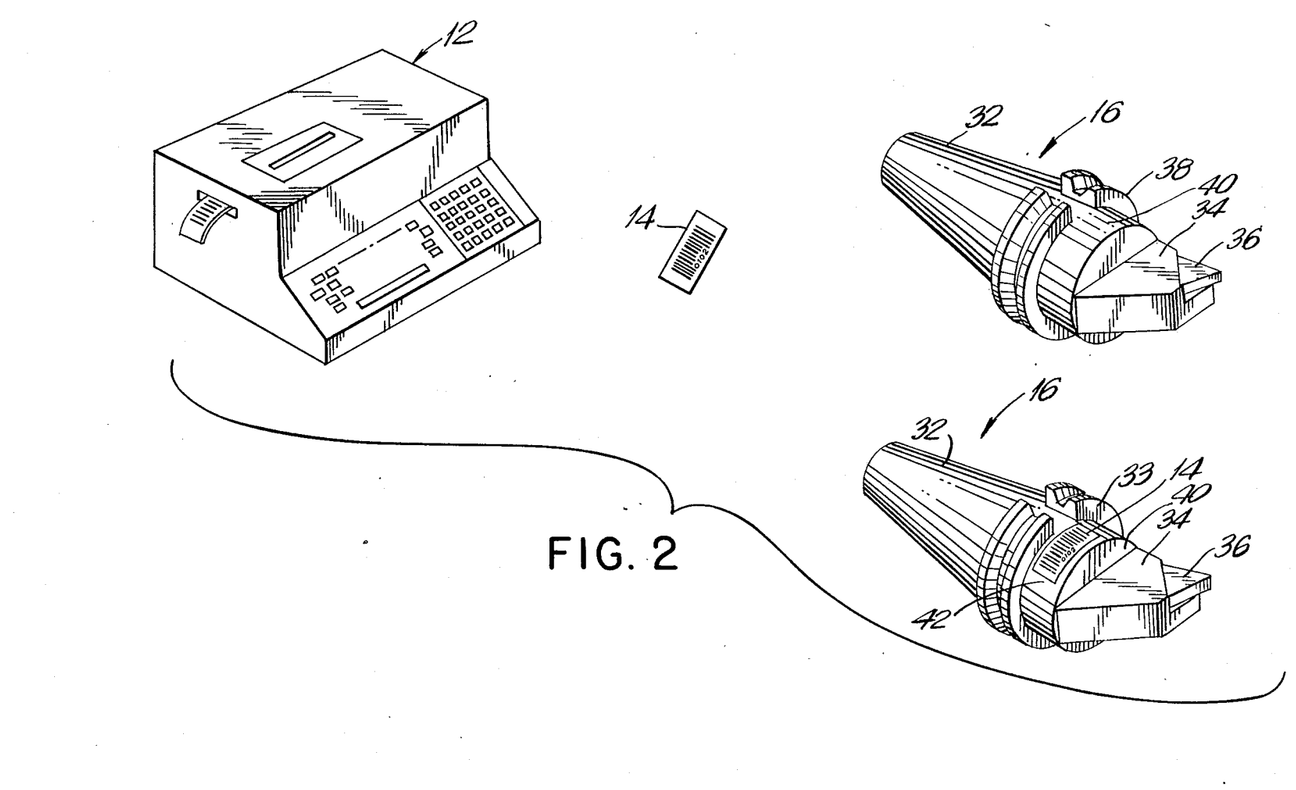
FIG. 2 is a schematic drawing of the bar coder and of the bar coded label applied to a cutting tool.

Referring now to the drawings and particularly to FIGS. 1 and 2, there is shown an illustrative embodiment of the system 10 of the present invention which includes a bar coder 12 (FIG. 2) for printing labels 14 to be affixed to the cutting tools 16, a magazine 18 (FIG. 1) for storing the indexed or labeled cutting tools 16, a reader 20 for selecting indexed cutting tools 16 from the magazine 18, a tool holder 22 for receiving the selected cutting tools 16, and a tool changing arm mechanism 24 for gripping and transferring cutting tools 16 between the storage magazine 18 and the tool holder 20.

The system 10 either can be positioned at or remote from the tool holder 22. In the event of a remote location the tool holder 22 is delivered to the machine tool automatically or by an operator (not shown). In the illustrative embodiment the magazine 18, the reader 20, tool changing arm mechanism 24 and the tool holder 22 are mounted on a common base 25, and wherein the tool holder 22 can be slidably moved to the machine tool (not shown).

Figure 3:
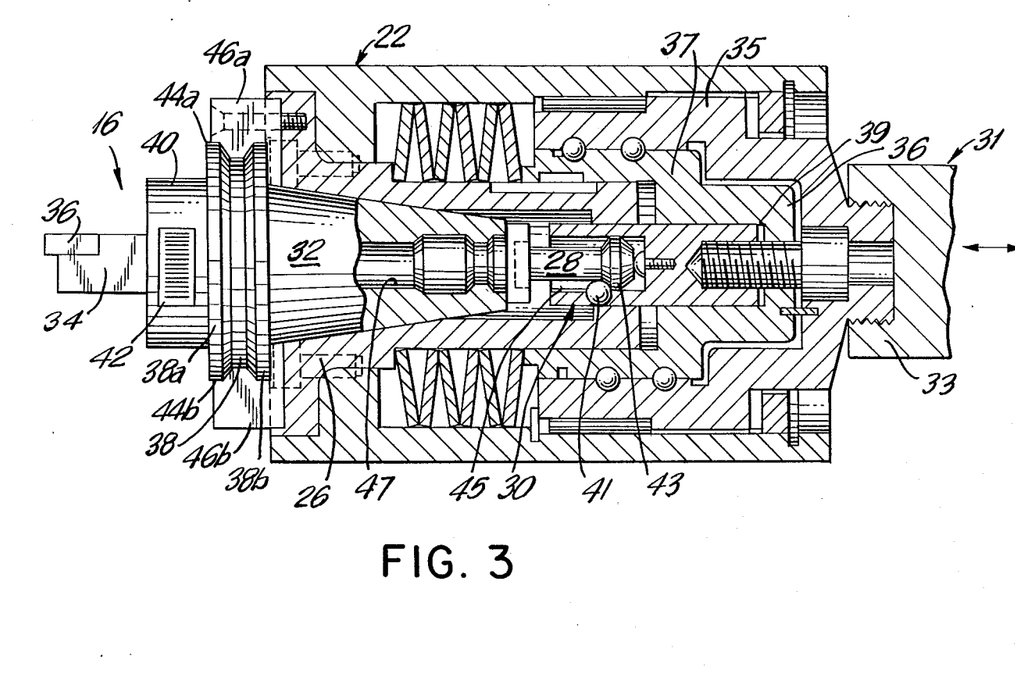
FIG. 3 is a side elevational view in cross section of a toolholder which can be used in the illustrative embodiment of the invention.

As shown in FIG. 3 the tool holder 22 is of the clamp block type and includes a tapered insert 26 for receiving complimentary tapered cutting tools 16 and coaxial detent knob members 28, and a ball detent mechanism 30 actuated to lock and unlock cutting tools 16 therein. The tool holder 22 of the illustrative embodiment is disclosed in U.S. Patent Application, Ser. No. 481,548, filed Apr. 4, 1984 by Gunther R. Stahl, and assigned to the assignee of the present invention, the entire disclosure of which is hereby incorporated by reference. In the embodiment of the system 10 of the invention shown in the drawings the tool holder 22 is actuated automatically by a rotary actuator 31. In general a shaft 33 of the rotary actuator 31 is connected to the outer race 35 of the tool holder 32. The rotation of the shaft 33 in the counter clockwise direction causes the outer race 35 to turn and axially drive an inner race 37 and coupling 39 toward the knob member 28 of the cutting tool 16 until detent balls 41 (only one shown) fall away from the detent shoulder 43 to release the cutting tool 16. Since the coupling 39 engages the knob member 28, the axial movement of the coupling 39 also causes the cutting tool 16 to axially move a limited distance out of the tool holder 22 during the unlocking operation to facilitate its release. In the locking operation, the tapered or shank end of the cutting tool 16 is placed in the tapered insert 26 and the detent knob member 28 moves into the coupling chamber 45 and beyond the detent ball 41. The clockwise rotation of the shaft 33 then causes the outer race 25 to turn and move the inner race 37 and the coupling 39 to move axially and rearwardly toward the actuator shaft 33 until each detent ball 41 again moves into the chamber 45 and engages the detent shoulder 43 to lock the knob member 28 and the cutting tool 16 in the tool holder 22.

The system 10 of the invention can be used with a wide variety of standard and special cutting tools. In the illustrative embodiment the cutting tool 16 (FIG. 2) includes a tapered shank end 32 for insertion in the magazine 18 and the tool holder 22 and a head or workpiece end 34 which extends from the magazine 18 and the tool holder 22 and which holds a replaceable cutting insert 36 used for the machining of parts. Intermediate the ends is a V-shaped flanged groove 38 which is positioned immediately outside the magazine 18 and the tool holder 22 and which is used for gripping by the tool changing mechanism 24. Preferably between the flanged groove 38 and workpiece end 34 is an annular shoulder 40 which is well suited to receive a bar coded label 14. Also as shown in FIG. 3 the knob member 28 is secured in a complimentary shaped central bore 47 in the shank 32. For proper positioning of and handling loads on the cutting tools 16, there is provided opposing keyways 44a and 44b in the flanges 38a and 38b which are engageable by complimentary keys 46a and 46b on the toolholder 12 and magazine 18. Preferably there is a close fit between the upper key 46a and upper keyway 44a for orientation and load bearing and a loose fit between the lower key 46b and lower keyway 44b for orientation.

Normally the cutting tool components, e.g., shank 32, workpiece end 34 and cutting insert 36, are manufactured within given tolerances. Accordingly, tools of the same type generally have slightly different dimensions. Typically cutting tools 16 of the same type can differ from one another by about 0.010 to about 0.020 inches. These differences result in offsets which can be pre-gauged by the system described in the U.S. Patent Application filed simultaneously herewith and owned by the assignee of the present invention, the entire disclosure of which is hereby incorporated by reference.

The type of cutting tool 16 and other information about the tool 16, e.g., the pre-gauged offset, can be entered in the bar coder 12. As shown in FIG. 2 the coder 12 prints bar coded labels 14 containing the desired information about the tool and the label 14 is applied to the annular shoulder 40 of the tool 16 so that it can be read by the system 10 and, if desired, by the controls of machine tool. In the illustrative embodiment the label 14 is applied to the upper face 42 of the shoulder 40. Further, in the illustrative embodiment the bar code 12 is a commercially available coder sold by Metrologic Instruments, Inc. of Bellmawr, N.J., under designation number MS 132.

The cutting tools 16 with the bar coded labels 14 affixed thereto are stored in the tool storage magazine 18. The magazine 18 is mounted on one end of the base 25 and can be either manually and/or automatically operated. In the illustrative embodiment shown in FIGS. 4 and 5, the magazine 18 comprises a rotatable turret 50 that is mounted on and automatically rotated by an index table 51. The turret 50 has a central chamber 52, vertical apertures 54 and 56 therethrough, and a plurality of sockets 58 about its perimeter which extends therefrom in the horizontal plane.

Figure 4:
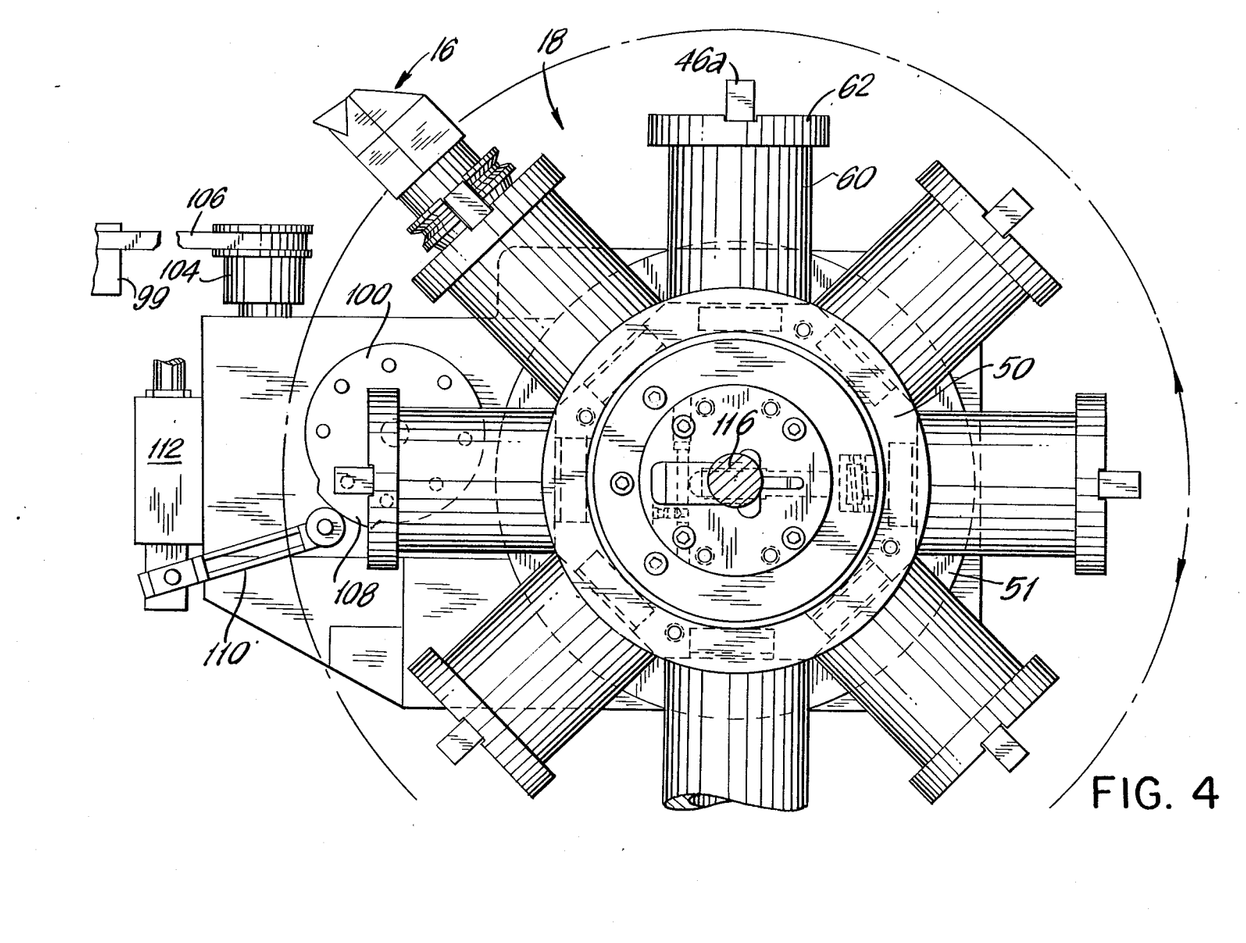
FIG. 4 is plan view of one embodiment of the storage magazine of the invention.
Figure 5:
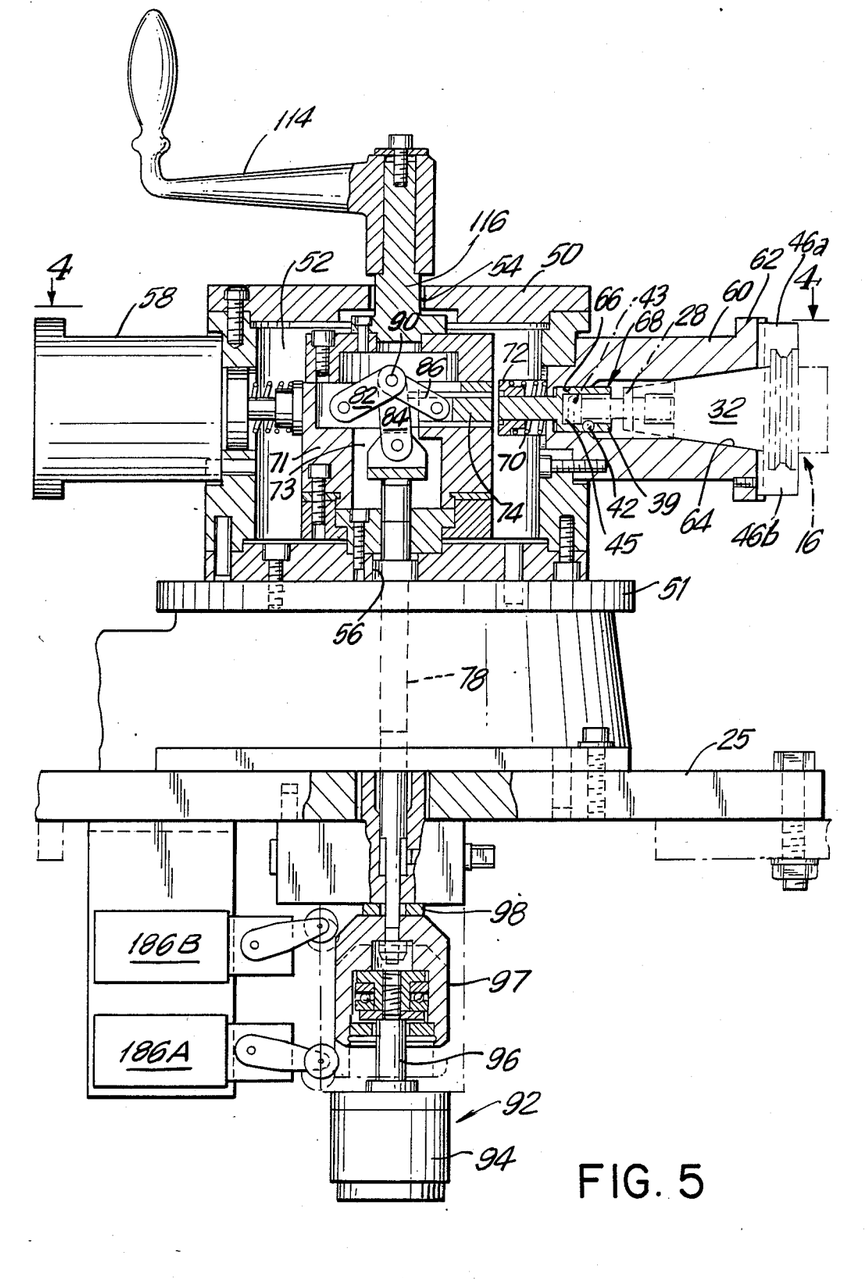
FIG. 5 is side elevational view of the storage magazine of FIG. 4.

In the illustrative embodiment, there are eight sockets 58, wherein each socket 58 includes a cylindrical body 60 attached at its inner end to the turret 50 and a flange 62 integral with the outer end of the body 60. The body 60 includes a tapered bore 64, at its outer end for receiving the shank end 32 of a cutting tool 16 and a bore 66 extending rearwardly from the base of the bore 64 through the body 60 where it opens into the chamber 52. The bore 66 receives the detent member 28 of the cutting tool 16 and a ball detent mechanism 68, similar to the ball detent mechanism 30 of the tool holder 22, for locking and unlocking the cutting tool 16 therein.

In this instance, a spring 70 is biased between a retainer 72 secured to the inner end of the coupling member 39 and the inner end of the cylinder body 60. As shown, the spring 70 normally biases the coupling member 39 rearwardly so that the detent balls 41 (only one shown) retain the knob member 28 and lock the cutting tool 16 in the socket 58. When a cutting tool 16 is to be released, the coupling member 39 is axially moved foward a limited distance so that each ball 41 falls away from the detent shoulder 43 to release the cutting tool 16. At the same, the coupling member 39 engages the knob member 28 and moves the cutting tool 16 a limited distance forward to facilitate its release. In the locking operation, the shank end 32 is placed in the tapered socket 58 and the knob member 28 moves into the coupling chamber 45 and beyond each detent ball 41. Further axial and rearward movement of the cutting tool 16 then causes the coupling 39 to move axially and rearwardly until the detent balls 41 again move into the chamber 45 and engage the detent shoulder 43 to lock the knob member 28 and the cutting tool 16 in its socket 58.

Within the rotatable turret 50 is a normally stationary housing 71 having a central chamber 73, and a bore 74 therethrough in horizontal alignment with the ball detent mechanism 68 at the transfer station as shown in FIG. 1. Within the bore 74 is a plunger 76 adapted to extend therefrom for engaging the ball detent mechanism 68 and unlocking the cutting tool 16 held by the socket 58 at the tool transfer station.

The lateral movement of the plunger 76 is effectuated by a vertical shaft 78 connected thereto through primary, actuating and plunger links 82, 84 and 86 within the chamber 73. The links 82, 84 and 86 are pivotally connected at one end to a common dowel 90 and at their opposite ends to the housing 71, the upper end of the shaft 78 and the inner end of the plunger 76, respectively. The shaft 78 extends downwardly from the link 84 through the housing 71, turret 50, index table 51 and base 25 and is connected to a reciprocating pneumatic drive 92.

The pneumatic drive 92 includes a cylinder 94, a piston driven rod 96 which extends from the cylinder 94, and a coupling 97 which connects the rod 96 and shaft 78 together. As shown in FIG. 5, when rod 96 is extended, it advances the shaft 78 upwardly until the coupling 97 contacts the stop 98. In the advanced vertical position, the link 86 laterally retracts the plunger 76 within the housing 70 and the cutting tool 16 remains locked in the adjacent socket 58. Correspondingly, when the rod 96 is moved downwardly, the shaft 78 is retracted extending the link 86 and causing it to laterally advance the plunger 76 into engagement with and advance the coupling member 45 for the release of the cutting tool 16.

The turret 50 is rotated by the index table 51 in a conventional manner. In the illustrative embodiment, a standard T-8-8 Jackson Table Index and a control cam mechanism sold by Jackson Machine Products of Madison Heights, Mich. are used. As shown in FIG. 4, an electric motor 99 rotates the cam 100 and the table 51 through an electric clutch 104 and connecting belt 106. The cam 100 has a lobe 108 which corresponds to the dwell time for holding each cutting tool 16 at the tool transfer station for scanning and transfer. Upon each rotation of the cam 100, the lobe 108 comes into contact with an arm 110 of a limit switch 112 connected to the clutch 104. During the dwell time the lobe 108 and arm 110 are in contact, the switch 112 de-energizes the clutch and the table 51 does not rotate the turret 50 allowing for the scanning and selection operation. Upon disengagement between the switch arm 110 from the lobe 108, the switch 112 again energizes the clutch 104 and the motor 99 drives the table 51 until the next socket 58 is at the tool transfer station. Thus, for each revolution of the cam 100, the table 51 rotates one socket 58 into the tool transfer station with an appropriate dwell time for scanning and selection.

Alos, a handle 114 (FIG. 5) and an adaptor 116 which extends into the turret 50 through the apertures 54 and 72 can be used to manually rotate the turret assembly. In the illustrative embodiment, the manual operation is used to facilitate unloading and loading of the magazine 18 by rotating the socket 58 at the tool transfer station 90° therefrom. In this position a cutting tool 16 can easily be inserted and removed from the socket 58.

The information about each cutting tool 16 on the label 14 is read at the tool transfer station by the reader 20 (FIG. 1). The reader 20 includes a scanner 120 and a display 122 mounted on a stand 124 which is secured to the base 25 and which vertically positions the reader 20 over and above the cutting tool 16 at the tool transfer station. The display unit 122 includes a keyboard 126 used to manually program the type of tool the reader 20 should seek. The reader 20 also can be automatically operated to facilitate unmanned operation of the system. The scanner 120 reads each label 14 and displays the information on display 122. The reader 20 selects the predetermined cutting tool 16 while that tool 16 is held at the tool transfer station. In the illustrative embodiment the reader 20 is a neon laser type but any reader 20 which performs as described can be used in the invention. In the illustrative embodiment the reader 20 is commercially available and is sold by Metrologic Instruments, Inc. of Bellmawr, N.J. under designation MS 131 and Model Number 46-124.

Figure 6:
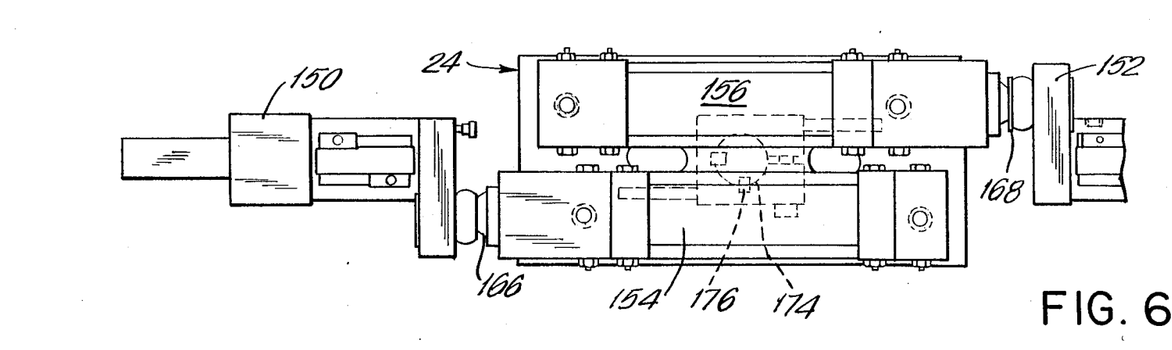
FIG. 6 is a plan view of one embodiment of the tool changing arm assembly of the invention.
Figure 7:
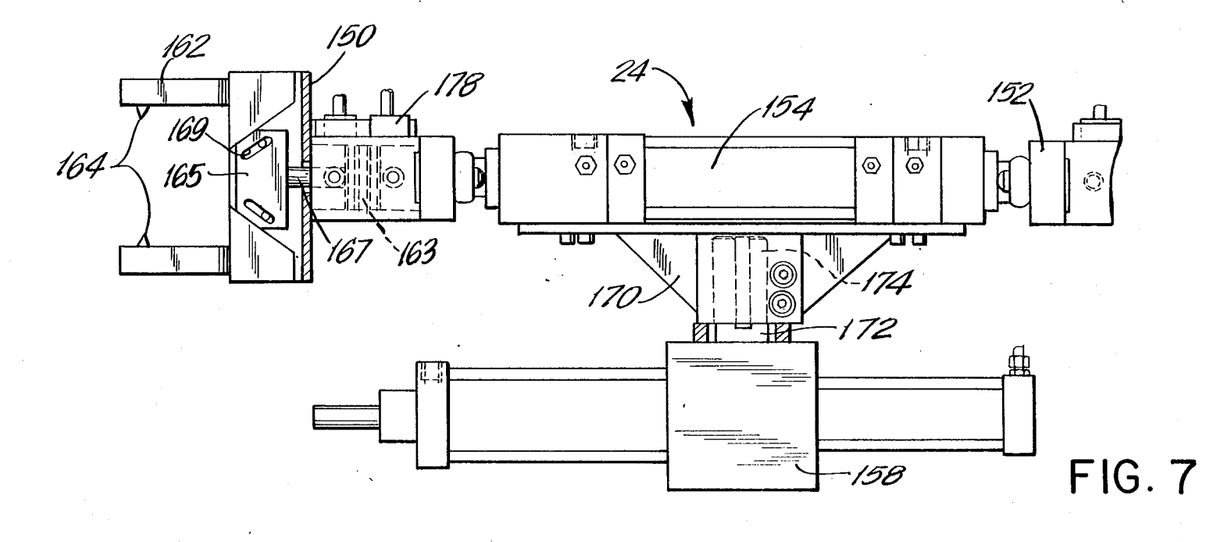
FIG. 7 is a side view of the tool changing arm assembly shown in FIG. 6.

The tool changing arm mechanism 24 for transferring the cutting tool 16 between the tool magazine 18 and tool holder 22 is illustrated in FIGS. 6 and 7 and includes grippers 150 and 152, cylinders 154 and 156 and a rotary actuator 158. As generally shown in FIG. 1 the actuator 158 is centrally mounted on the base 25 between the magazine 18 and the tool holder 22.

The grippers 150 and 152 of the mechanism 24 includes parallel jaws 162 with teeth 164 that mesh with the v-flange groove 38 of the cutting tool 16 for gripping.

As shown in FIG. 7, each gripper 150, 152 includes a double acting piston 163 attached to a cam plate 165 by a connecting rod 167. The cam plate 165 has angled slots 169 which form a wedge. The sliding parallel jaws 162 are attached to the cam plate 165 by pins 171 through the angled slots 169. As the piston 163 is reciprocated, the teeth 164 of the sliding jaws 162 can be closed on or separated from a cutting tool 16.

The grippers 150, 152 are connected to corresponding piston driven rods 166, 168 which are reciprocally mounted in cylinders 154, 156 for extensible movement of the grippers 150, 152. The cylinders 154 and 156 are mounted to an adapter 170 which is attached to a shaft 172 of the rotary actuator 158 by keys 174 inserted in key ways 176. After the cutting tools 16 have been gripped and removed from the tool magazine 18 and tool holder 22, the actuator 158 rotates the mechanism 24 180° to effectuate the transfer of the cutting tools. As will be explored hereinafter reed switches 178A-178H (FIG. 10) on the cylinders 154, 156 and the grippers 150, 152 are used in the gripping and transfer operation. In the illustrative embodiment the grippers, cylinders and reed switches are commercially available and sold by PHD Inc. of Fort Wayne, Ind. under the designations NEAG MS4 2×6-P-D-M for cylinders, S2809-95 for grippers, and AB10 switches.

As described earlier, the preliminary steps of the operation of the system 10 are performed by applying the bar coded labels 14 to the cutting tools 16 and storing the tools in the tool magazine 18. Thereafter, a particular type of cutting tool 16 required for a specific machining operation is entered into the reader 20 and the magazine 18 is rotated to present each cutting tool 16 to the tool transfer station. While each cutting tool 16 is at the tool transfer station, the scanner 120 bounces a laser beam directly off the bar coded labels 14 and sends the light beam to the reader 20 for analysis and appearance on the display 122. As described earlier, each cutting tool 16 is held at the transfer station for scanning and selection. At this point, the operator can verify that the reader 20 has selected the correct tool 16 by checking the identification number on the display 122, thus preventing incorrect tool use.

Figure 8A:
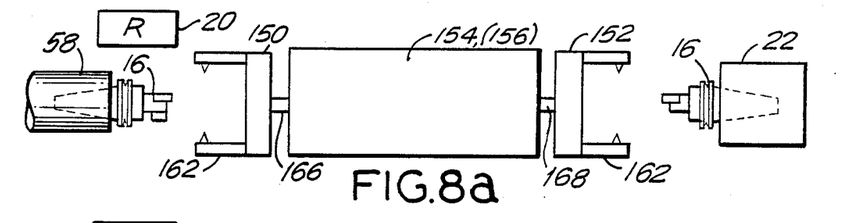
FIGS. 8a-8f are schematic drawings illustrating the operation of the arms in gripping and transferring cutting tools between the storage magazine and the tool holder.
Figure 8B:
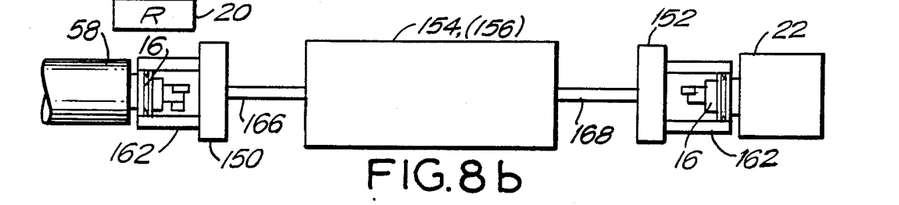

Concurrently with the selection of a cutting tool 16, the tool changer arm mechanism 24 is actuated. The operation of the mechanism 24 can be best described by referring to the schematic drawings in FIGS. 8a-8f. FIG. 8a shows the mechanism 24 before actuation in a fully retracted position with the jaws 162 open. Upon actuation the cylinders 154 and 156 are energized and the corresponding rods 166 and 168 extend the grippers 150 and 152. The jaws 162 are then energized to close and simultaneously grip the cutting tool 16 in the magazine 18 and the cutting tool 16 in the holder 22, as shown in FIG. 8b.

The ball detent release mechanisms 30 and 68 are then actuated to concurrently unlock the cutting tool 16 in the toolholder 22 and the selected cutting tool 16 from the magazine 18. As previously explained the unlocking of the cutting tools 16 releases them and causes them to advance a limited distance from the holder 22 and magazine 18.

Figure 8C:
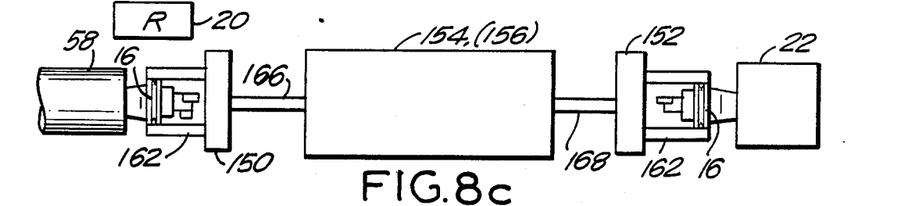

At the time the releasing mechanism 30 and 68 are energized, the pressure in the cylinders 154 and 156 is reduced, creating a momentary period of zero line pressure. This zero line pressure is effectuated by the pneumatic system described hereinafter. The effect of this zero line pressure is to cause the cylinders 154 and 156 to act as springs when the cutting tools 16 are released. The zero line pressure permits the ejection of the cutting tools 16 and causes the grippers 154 and 156 to retract toward each other the same limited distance that the cutting tools are ejected (FIG. 8c).

Figure 8D:
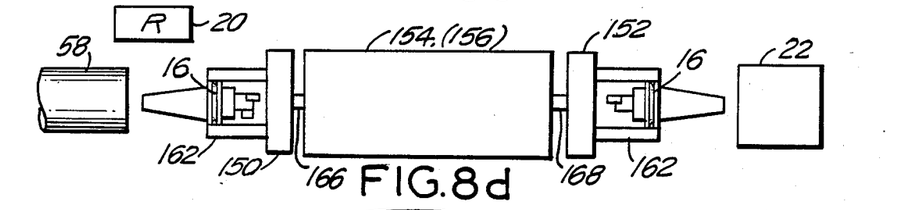
Figure 8E:
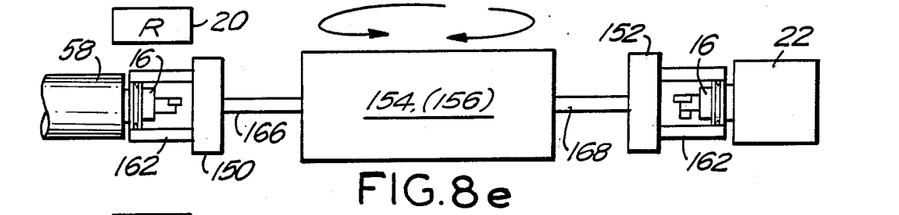
Figure 8F:
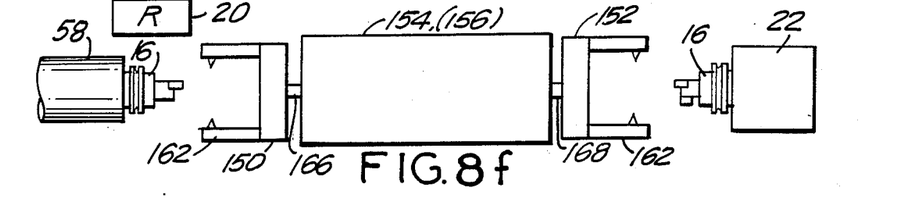

The cylinders 154 and 156 next are energized to fully retract the grippers 150 and 152 while gripping the cutting tools 16 as shown in FIG. 8d. The rotary actuator 158 now is energized to rotate the grippers 150 and 152 180° and the cylinders 154 and 156 are energized to insert the new cutting tool 16 into the tool holder 22 and the old cutting tool 16 into the tool magazine 18 (FIG. 8e). The cycle then is completed by de-energizing and opening the jaws 162 and energizing cylinders 154 and 156 to retract the grippers 150 and 152 to their fully retracted position as shown in FIG. 8f.

Figure 9:
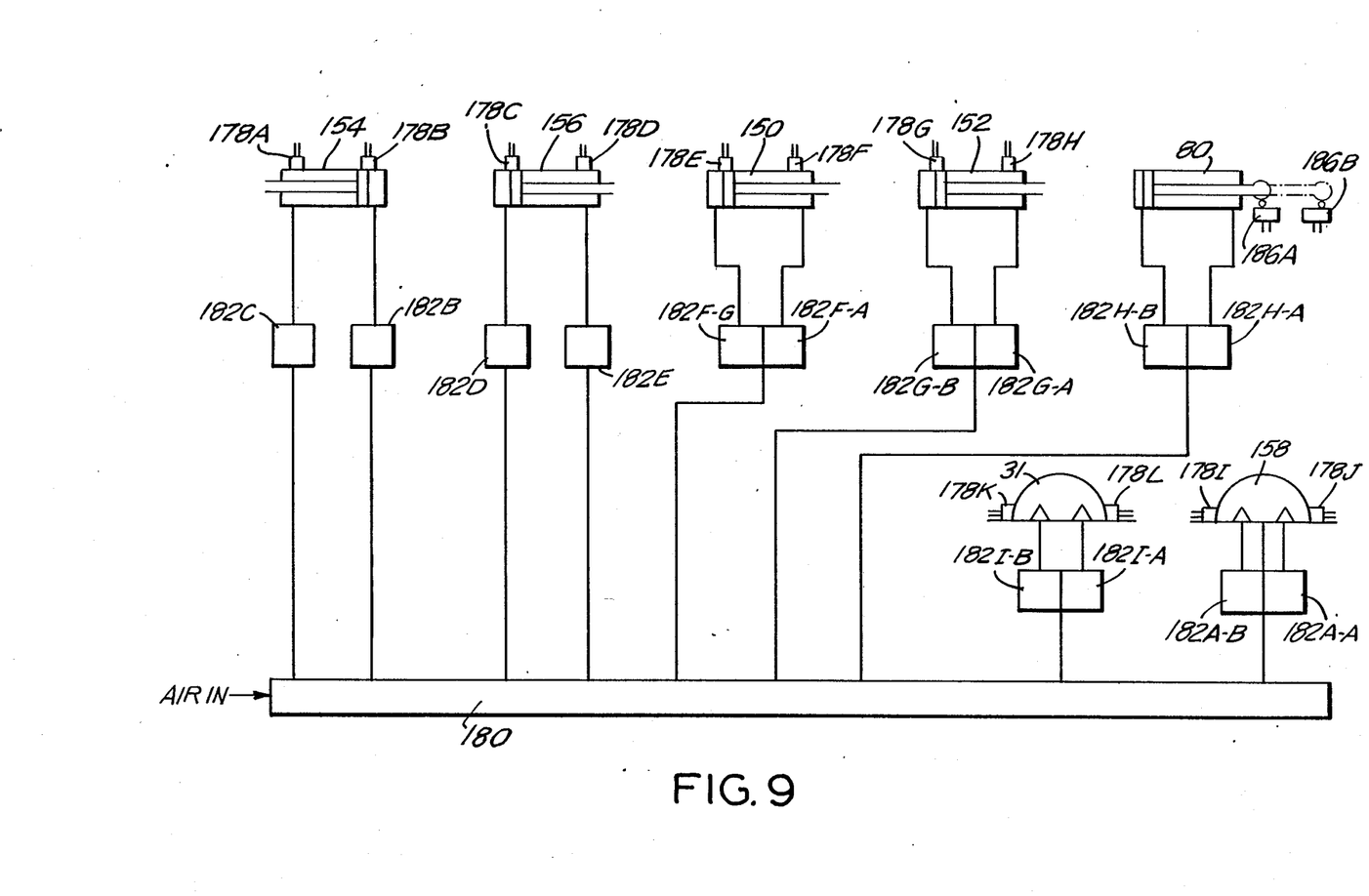
FIG. 9 is a schematic drawing for the pneumatic aspects of the system of FIG. 1.
Figure 10:
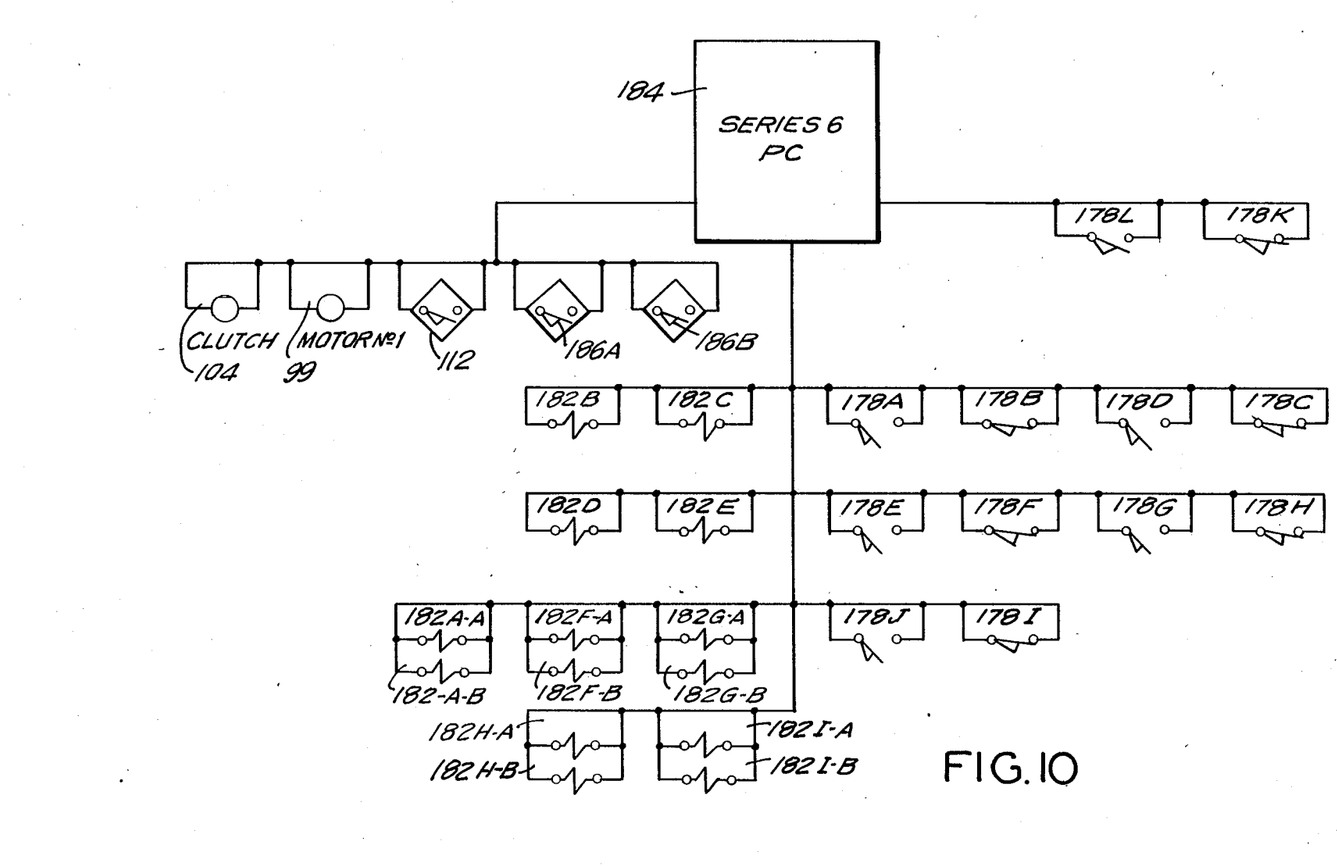
FIG. 10 is a schematic drawing for the electrical aspects of the system of FIG. 1.

The pneumatic and electrical operations of the system 10 is shown schematically in FIGS. 9 and 10. Air flows through the main air line 180 to the valves 182A-I. In the illustrative embodiment the valves 182 B, C, D and E are three-way two position solenoid valves and 182 A, F, G, H and I are four-way two position double solenoid valves. The magnetic reed switches 178 A-L are mounted on the grippers 150, 152, cylinders 154, 156 and rotary actuators 158 and 31 for sensing the position of the respective piston rods and rotary shafts. In one embodiment, the reed switches 178 A-L send a signal to a master controller 184 for automatic operation (FIG. 10). In FIG. 10 of the illustrative embodiment, the controller 184 is a commercially available program controller sold by the General Electric Company, Charlottesville, Va., under the designation Series 6 Programmable Controller, Model 60. Limit switches 186 A and B are operatively connected to the release mechanism 68 (FIG. 5) and are also wired to controller 184. The solenoid vaves 182 A-I are also electrically wired to controller 184 as shown in FIG. 10.

When a cutting tool 16 is ready to be transferred the controller 184 is actuated either manually by the operator or automatically by the reader 20. The operating cycle begins by energizing valves 182B and 182D and de-energizing valves 182C and 182E to extend cylinders 154 and 156 respectively. Full extension of the cylinder 154 and 156 will close the reed switches 178A and 178D which signals the controller 184 to energize valves 182F-A and 182G-A to close grippers 150 and 152 on the selected cutting tool 16 in the magazine 18 and the cutting tool 16 in the toolholder 22. The closing of the grippers 150 and 152 will close the reed switches 178 F and 178 H which signals the controller 184 to energize the valves 182 H-A and 182 I-A to operate the mechanism 68 to release the cutting tool 16 from the magazine 18 and to operate the rotary actuator 31 to release the cutting tool 16 from the tool holder 22. Concurrently with this step, the valves 182 B and 182 D are de-energized releasing the pressure from that side of the cylinders thereby providing a momentary period where there is no pressure on either side of the cylinders 154 and 156. As explained earlier, this momentary no line pressure permits the cylinders 154 and 156 to be pushed back for a limited distance, usually ¼" to ½" when the mechanism 80 releases the cutting tool 16 and the rotary actuator 31 releases the worn cutting tool 16.

The release of the cutting tools 16 closes the limit switch 186A and the reed switch 178L which signals the controller 184 to energize valves 182C and 182E thereby retracting the cylinders 154 and 156. The retraction of the cylinders 154 and 156 closes reed switches 178B and 178C which signals the controller 184 to energize valve 182A-A thereby rotating the cylinders 154, 156 and the gripper 150, 152 180°. The 180° rotation of rotary actuator 158 closes reed switch 178J which signals the controller 184 to energize the valves 182B and 182D and de-energize the valves 182C and 182E to again extend the cylinders 154 and 156. The extension of cylinders 154 and 156 closes the reed switches 178A and 178D which now signal the controller 184 to energize the valves 182H-B and 182I-B and de-energize 182H-A and 182I-A to clamp the cutting tools 16 in the magazine 18 and holder 22. The clamping closes limit switch 186B and reed switch 178K which signals the controller to energize valves 182F-B and 182G-B and deenergize valves 182F-A and 182G-A to open the jaws 162 of grippers 150 and 152 to release the cutting tools 16. The opening of the jaws 162 closes reed switches 178E and 178G which signals the controller to energize valves 182C and 182E and de-energize valves 182B and 182D to retract the cylinders 154 and 156. The retraction of cylinders 154 and 156 closes reed switches 178B and 178C which signals the controller to energize valves 182A-B and de-energize valve 182A-A to rotate actuator 158 180° and return the grippers 150 and 152 to their original position. The reed switch 178I is then closed and the tool changer mechanism 24 is ready to begin another cycle.

While illustrative embodiments of the subject invention have been described and illustrated, it is obvious that various changes and modifications can be made therein without departing from the spirit of the present invention which should be limited only by the scope of the appended claims.

What is claimed is:

1. A system for storing cutting tools and transferring the stored cutting tools to a tool holder, comprising:
   means for indexing the cutting tool;
   rotatable storage means for sorting a plurality of index cutting tools and for presenting the indexed cutting tools for selection and transfer;
   means operatively connected to said storage means for selecting an indexed cutting tool presented for selection; and
   tool changing arm assembly adjacent said storage and selecting means for transferring the selected indexed cutting tool from said storage means to the tool holder, including:
   a pair of extendable and retractable grippers mounted on a rotary actuator, wherein each of said grippers has engaging means for releasably holding cutting tools, and means connected to said assembly for sequentially operating said grippers and engaging means by extending said grippers, closing said engaging means, the first of said engaging means holding the selected cutting tool in said storage means, the second of said engaging means holding a cutting tool in the tool holder, retracting said pair of grippers with the cutting tools being held by said engaging means, rotating said grippers and engaging means so as to align the selected cutting tool with the tool holder and the cutting tool from the tool holder with said storage means, extending said grippers and inserting the selected cutting tool in the tool holder and the cutting tool from the tool holder in said storage means, and releasing said engaging means from the cutting tools, and retracting said grippers.

2. The system of claim 1, wherein said indexing means comprises a bar code printer for printing a bar code which is affixed to the cutting tools.

3. The system of claim 2, comprising a bar code reader positioned relative to said storage means for scanning the bar codes of the cutting tools therein, and means connected to said reader and said storage means for positioning the selected cutting tool for transfer from said storage means.

4. The system of claim 1, wherein said pair of grippers comprise parallel jaws with teeth that mesh with a groove on the cutting tool.

5. A system for storing cutting tools and for transferring stored cutting tools to a tool holder of a machine tool, comprising:
- a bar code printer for printing bar codes which are affixed to cutting tools,
- rotatable storage means including a turret having a plurality of sockets extending therefrom in a horizontal plane for storing a plurality of indexed cutting tools for selection and transfer,
- a bar code reader for scanning the bar codes on the cutting tools as they are rotated by said reader for selection of a cutting tool,
- means connected to said storage means and bar code reader for positioning the selected cutting tool for transfer,
- a tool changer mechanism between the tool holder and said storage means, including
- a pair of opposing extensible and retractable grippers mounted on a rotary actuator,
- a pair of pneumatically actuated cylinders for extending said extensible and retractable grippers, the full extension thereof resulting in the simultaneous closing of said pair of grippers on the selected cutting tool in said rotatable storage means and a cutting tool in the tool holder;
- means connected to said pneumatic cylinders for deenergizing said pneumatic cylinders so as to allow the selected cutting tool and the cutting tool in the tool holder to be ejected a distance from their respective holders whereupon the pneumatic cylinders are actuated so as to completely retract said pair of grippers with the cutting tools therein, and
- means to energize said rotary actuator to effect a 180 degree rotation of said grippers whereupon the pneumatic cylinders are actuated so as to completely extend the grippers to insert the selected cutting tool into the tool holder and to insert the cutting tool from the tool holder into said storage means, the full extension thereof resulting in the opening of said grippers whereupon the pneumatic cylinders are deenergized to retract the grippers, the retraction further energizing said rotary actuator to return said grippers to their original position.

6. A method for transferring indexed cutting tools between a rotatable storage means and a tool holder of a machine tool, comprising:
- entering on a keyboard of a bar code reader a bar code of the cutting tool selected for transfer;
- positioning each tool in the rotatable storage means at a tool transfer station for reading the bar codes of each tool;
- scanning each tool for the selected cutting tool bar codes by means of a bar code scanner; and
- operating a tool changing assembly having a pair of opposing extendable and retractable grippers mounted on a rotary actuator positioned between the rotatable storage means and the tool holder, wherein each of said grippers has engaging means for releasably holding the cutting tools as follows: extending said grippers and closing said engaging means on the selected cutting tool in said storage means, closing said engaging means on a cutting tool in the tool holder, retracting said grippers with the cutting tools being held by said engaging means, rotating the assembly 180 degrees and extending said grippers for inserting the selected cutting tool holder and the cutting tool from the tool holder in said storage means, releasing the cutting tools from said engaging means, and retracting and rotating said grippers 180 degrees back to their original position.

7. A method for transferring indexed cutting tools between a rotatable storage means and a tool holder of a machine tool, comprising:
- entering on a keyboard of a bar code reader a bar code of the cutting tool selected for transfer;
- positioning each tool in the rotatable storage means at a tool transfer station for reading the bar code of each tool means of a bar code scanner;
- holding at the tool transfer station the selected tool to be transferred; and
- actuating a tool changing arm assembly whereby a pair of opposing extendable and retractable grippers mounted on a rotary actuator are extended by means of a pair of pneumatically actuated cylinders, the full extension thereof resulting in the simultaneous closing of said pair of grippers on the selected tool in the tool transfer station and a cutting tool in the tool holder, whereupon the pneumatic cylinder is deenergized so as to allow the selected cutting tool and the tool holder cutting tool to be ejected a distance from their respective holders whereupon the pneumatic cylinders are actuated so as to completely retract said pair of grippers with the cutting tools therein, the retraction thereof energizing the rotary actuator to effect a 180 degree rotation of the grippers, whereupon the pneumatic cylinders are again actuated so as to completely extend the grippers to insert the selected cutting tool into the tool holder and the cutting tool from the tool holder into the storage means, the full extension thereof resulting in the opening of the grippers whereupon the pneumatic cylinders are deenergized to retract the grippers, the retraction further energizing the rotary actuator to return the grippers to their original position.

* * * * *